US012505751B2

(12) United States Patent
Baladhandapani et al.

(10) Patent No.: US 12,505,751 B2
(45) Date of Patent: Dec. 23, 2025

(54) TRANSCRIPTION SYSTEMS AND RELATED SUPPLEMENTATION METHODS

(71) Applicant: HONEYWELL INTERNATIONAL INC., Charlotte, NC (US)

(72) Inventors: Gobinathan Baladhandapani, Madurai (IN); Mohammed Ibrahim Mohideen, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 444 days.

(21) Appl. No.: 17/808,816

(22) Filed: Jun. 24, 2022

(65) Prior Publication Data

US 2023/0368682 A1 Nov. 16, 2023

(30) Foreign Application Priority Data

May 12, 2022 (IN) .............................. 202211027323

(51) Int. Cl.
*G08G 5/06* (2006.01)
*B64D 43/00* (2006.01)
(Continued)

(52) U.S. Cl.
CPC ............... *G08G 5/51* (2025.01); *B64D 43/00* (2013.01); *G06F 3/167* (2013.01); *G06F 40/169* (2020.01);
(Continued)

(58) Field of Classification Search
CPC .... G08G 5/065; G08G 5/0017; G08G 5/0021; G08G 5/003; B64D 43/00; G06F 3/167;
(Continued)

(56) References Cited

U.S. PATENT DOCUMENTS

| 6,992,626 B2 | 1/2006 | Smith |
|---|---|---|
| 7,184,863 B2 | 2/2007 | Weineck |

(Continued)

FOREIGN PATENT DOCUMENTS

| CN | 110335609 A | 10/2019 |
|---|---|---|
| CN | 111785257 A | 10/2020 |

(Continued)

OTHER PUBLICATIONS

Cardosi, Kim and Tracy Lennertz."Loss of Controller-Pilot Voice Communications in Domestic En Route Airspace." DOT-VNTSC-FAA-17-04, dated Feb. 2016.

(Continued)

*Primary Examiner* — Anil K Bhargava
(74) *Attorney, Agent, or Firm* — Ingrassia Fisher & Lorenz LLP

(57) ABSTRACT

Methods and systems are provided for assisting operation of a vehicle using speech recognition and transcription to provide a conversation log graphical user interface (GUI) display. One method involves analyzing a transcription of an audio communication depicted on the conversation log GUI display to identify an operational subject associated with the audio communication, obtaining supplemental information pertaining to the operational subject from a data source, generating, on the conversation log GUI display, a selectable GUI element associated with the supplemental information, and in response to user selection of the selectable GUI element, generating, on the display device, a graphical representation based at least in part on the supplemental information. In some implementations, a separate supplemental information GUI display is presented in lieu of the conversation log GUI display in response to selection of the selectable GUI element.

20 Claims, 6 Drawing Sheets

(51) Int. Cl.

| | | |
|---|---|---|
| *G06F 3/16* | (2006.01) | |
| *G06F 40/169* | (2020.01) | |
| *G06F 40/279* | (2020.01) | |
| *G06F 40/295* | (2020.01) | |
| *G06F 40/30* | (2020.01) | |
| *G08G 5/20* | (2025.01) | |
| *G08G 5/21* | (2025.01) | |
| *G08G 5/30* | (2025.01) | |
| *G08G 5/51* | (2025.01) | |
| *G10L 15/22* | (2006.01) | |
| *G10L 15/26* | (2006.01) | |

(52) U.S. Cl.
CPC .......... *G06F 40/279* (2020.01); *G06F 40/295* (2020.01); *G06F 40/30* (2020.01); *G08G 5/20* (2025.01); *G08G 5/21* (2025.01); *G08G 5/30* (2025.01); *G10L 15/22* (2013.01); *G10L 15/26* (2013.01)

(58) Field of Classification Search
CPC .... G06F 40/169; G06F 40/279; G06F 40/295; G06F 40/30; G10L 15/22; G10L 15/26
See application file for complete search history.

(56) References Cited

U.S. PATENT DOCUMENTS

| | | | |
|---|---|---|---|
| 7,415,326 | B2 | 8/2008 | Komer et al. |
| 7,668,719 | B2 | 2/2010 | Nakagawa et al. |
| 7,733,903 | B2 | 6/2010 | Bhogal et al. |
| 7,809,405 | B1 | 10/2010 | Rand et al. |
| 7,881,832 | B2 | 2/2011 | Komer et al. |
| 8,149,141 | B2 | 4/2012 | Coulmeau et al. |
| 8,180,503 | B2 | 5/2012 | Estabrook et al. |
| 8,280,741 | B2 | 10/2012 | Colin et al. |
| 8,340,839 | B2 | 12/2012 | Yogesha et al. |
| 8,645,136 | B2 | 2/2014 | Milstein |
| 8,681,040 | B1 | 3/2014 | Rathinam et al. |
| 8,704,701 | B2 | 4/2014 | Pschierer et al. |
| 8,768,698 | B2 | 7/2014 | Mengibar et al. |
| 8,793,139 | B1 | 7/2014 | Serban et al. |
| 8,812,316 | B1 | 8/2014 | Chen |
| 8,909,392 | B1 | 12/2014 | Carrico |
| 8,957,790 | B2 | 2/2015 | Cornell et al. |
| 9,047,870 | B2 | 6/2015 | Ballinger et al. |
| 9,190,073 | B2 | 11/2015 | Dong et al. |
| 9,443,433 | B1 | 9/2016 | Conway et al. |
| 9,487,167 | B2 | 11/2016 | Graumann et al. |
| 9,620,119 | B2 | 4/2017 | Bilek et al. |
| 9,642,184 | B2 | 5/2017 | Plocher et al. |
| 9,665,645 | B2 | 5/2017 | Hawley |
| 9,666,178 | B2 | 5/2017 | Loubiere et al. |
| 9,704,405 | B2 | 7/2017 | Kashi et al. |
| 9,830,829 | B1 | 11/2017 | Doyen et al. |
| 9,881,608 | B2 | 1/2018 | Lebeau et al. |
| 10,056,085 | B2 | 8/2018 | Klose et al. |
| 10,204,430 | B2 | 2/2019 | Gowda |
| 10,490,085 | B2 | 11/2019 | Cotdeloup et al. |
| 10,535,351 | B2 | 1/2020 | Gaston et al. |
| 10,818,192 | B2 | 10/2020 | Chen et al. |
| 2004/0124998 | A1 | 7/2004 | Dame |
| 2004/0263381 | A1 | 12/2004 | Mitchell et al. |
| 2005/0144187 | A1 | 6/2005 | Che et al. |
| 2005/0203700 | A1 | 9/2005 | Merritt |
| 2006/0229873 | A1 | 10/2006 | Eide et al. |
| 2007/0189328 | A1 | 8/2007 | Judd |
| 2007/0288128 | A1 | 12/2007 | Komer et al. |
| 2008/0201148 | A1 | 8/2008 | Desrochers |
| 2011/0028147 | A1 | 2/2011 | Calderhead, Jr. et al. |
| 2011/0125503 | A1 | 5/2011 | Dong et al. |
| 2011/0137653 | A1 | 6/2011 | Ljolje et al. |
| 2011/0202351 | A1 | 8/2011 | Plocher et al. |
| 2011/0231036 | A1 | 9/2011 | Yogesha et al. |
| 2012/0078448 | A1 | 3/2012 | Dorneich et al. |
| 2012/0239761 | A1* | 9/2012 | Linner .................. G06F 40/279 709/206 |
| 2013/0093612 | A1 | 4/2013 | Pschierer et al. |
| 2013/0103297 | A1 | 4/2013 | Bilek et al. |
| 2014/0300495 | A1 | 10/2014 | Scheu et al. |
| 2015/0081138 | A1 | 3/2015 | Lacko et al. |
| 2015/0162001 | A1 | 6/2015 | Kar et al. |
| 2015/0212671 | A1 | 7/2015 | Judy et al. |
| 2015/0212701 | A1 | 7/2015 | Rodney et al. |
| 2015/0312175 | A1 | 10/2015 | Langholz |
| 2016/0036751 | A1* | 2/2016 | Ban ........................ H04M 3/42 455/414.1 |
| 2016/0063999 | A1 | 3/2016 | Gaston et al. |
| 2016/0125744 | A1 | 5/2016 | Shamasundar et al. |
| 2016/0155435 | A1* | 6/2016 | Mohideen ............... G10L 15/01 704/235 |
| 2016/0360336 | A1* | 12/2016 | Gross .................... H04W 4/025 |
| 2016/0379640 | A1* | 12/2016 | Joshi ....................... G10L 15/26 704/235 |
| 2017/0039858 | A1 | 2/2017 | Wang et al. |
| 2018/0061243 | A1 | 3/2018 | Shloosh |
| 2019/0147858 | A1 | 5/2019 | Letsu-Dake et al. |
| 2019/0244528 | A1 | 8/2019 | Srinivasan et al. |
| 2020/0251113 | A1 | 8/2020 | Lebeau et al. |
| 2020/0322040 | A1 | 10/2020 | Middlestead et al. |
| 2020/0372916 | A1 | 11/2020 | Delpech |
| 2021/0295840 | A1 | 9/2021 | John et al. |
| 2022/0078071 | A1 | 3/2022 | Agapitos et al. |
| 2022/0309928 | A1* | 9/2022 | Chopra ................. G06F 40/284 |
| 2022/0343897 | A1 | 10/2022 | Agarwal et al. |
| 2022/0406194 | A1 | 12/2022 | Saptharishi et al. |

FOREIGN PATENT DOCUMENTS

| | | |
|---|---|---|
| DE | 102009025530 A1 | 12/2010 |
| EP | 0613110 A1 | 8/1994 |
| EP | 0618565 A2 | 10/1994 |
| EP | 1318492 A2 | 6/2003 |
| EP | 2026328 A1 | 2/2009 |
| EP | 3203458 A2 | 8/2017 |
| EP | 3474256 A1 | 4/2019 |
| EP | 3664065 A1 | 6/2020 |
| EP | 3889947 A1 | 10/2021 |
| FR | 3032574 A1 | 8/2016 |
| FR | 3032575 A1 | 8/2016 |
| FR | 3009759 B1 | 3/2017 |
| KR | 102003321 B1 | 7/2019 |
| WO | 2016076939 A1 | 5/2016 |

OTHER PUBLICATIONS

"Air-Ground Voice Communications," SKYbrary, downloaded from Internet Mar. 28, 2018.

"Loss of Communication," SKYbrary, downloaded from Internet Mar. 28, 2018.

* cited by examiner

TRANSCRIPTION SYSTEMS AND RELATED SUPPLEMENTATION METHODS

CROSS REFERENCE TO RELATED APPLICATION

This application claims priority to India Provisional Patent Application No. 202211027323, filed May 12, 2022, the entire content of which is incorporated by reference herein.

TECHNICAL FIELD

The subject matter described herein relates generally to vehicle systems, and more particularly, embodiments of the subject matter relate to avionics systems and methods for supplementing communications using different onboard sources.

BACKGROUND

Air traffic control typically involves voice communications between air traffic control and a pilot or crewmember onboard the various aircrafts within a controlled airspace. For example, an air traffic controller (ATC) may communicate an instruction or a request for pilot action by a particular aircraft using a call sign assigned to that aircraft. Taxi instructions, also referred to as a taxi clearance, provide a specific route (i.e., a sequence of taxiways, runways, or segments thereof) which an aircraft (or another vehicle) should follow when traversing between locations on the ground (e.g., between terminals, hangars and/or runways) to avoid confusion and/or runway incursions or to otherwise maintain safe and organized ground traffic flow. Taxi instructions are typically received by a pilot from the ATC immediately prior to taxiing the aircraft, for example, from a terminal and/or hangar to a runway for departure, from a runway to a terminal and/or hangar after landing, or to otherwise taxi the aircraft clear of a runway. Larger airports typically have a large number of taxiways, runways, terminals and/or hangars, potentially resulting in more complex taxi instructions, which in combination with an increasing amount of ground traffic (which also increases the likelihood of runway incursions), further increases the demand on a pilot.

In addition to the various that can complicate clearance communications generally (e.g., the volume of traffic in the airspace, similarities between call signs of different aircrafts in the airspace, congestion or interference on the communications channel being utilized, and/or human fallibilities such as inexperience, hearing difficulties, memory lapse, language barriers, distractions, fatigue, etc.), pilots taxiing in airport layouts with complex intersections of taxiways and/or runways requires careful understanding of a taxi clearance issued by the ATC to avoid incursions. However, due to the congested nature of radio communication in such airports, the taxi clearance generally includes only limited taxiing information. Pilots who are unfamiliar taxiing in such airports and lack understanding of the finer details associated with issued clearance may halt during taxiing and request clarifications or additional clearance from ATC, which extends the overall taxi time and risks increasing the likelihood of incursions during periods of congestion.

In addition to audio communications with ATC, aircraft may also receive alerts, advisories, notices, instructions or other clearance communications from various other sources, such as, for example, a controller-pilot datalink (CPDLC) system, an automatic terminal information service (ATIS), an aircraft communications addressing and reporting system (ACARS), and the like. Thus, when a pilot attempts to brief or review received communications, the pilot is often required to manually locate and obtain the desired information from different sources onboard the aircraft, and then either jot down or mentally retain and synthesize the information to obtain a comprehensive understanding of the current situation. Accordingly, it is desirable to provide aircraft systems and methods that reduce head-down time and facilitate a pilot maintaining situational awareness and adhering to clearances, instructions or other communications from various onboard sources to improve safety and efficiency of operation. Other desirable features and characteristics of the methods and systems will become apparent from the subsequent detailed description and the appended claims, taken in conjunction with the accompanying drawings and the preceding background.

BRIEF SUMMARY

Methods and systems are provided for assisting operation of a vehicle, such as an aircraft, using speech recognition and transcription. One method involves obtaining a transcription of an audio communication with respect to a vehicle, generating, on a display device, a conversation log graphical user interface (GUI) display comprising a graphical representation of the transcription of the audio communication, analyzing the transcription to identify an operational subject associated with the audio communication, obtaining supplemental information pertaining to the operational subject from a data source, generating, on the conversation log GUI display, a selectable GUI element associated with the supplemental information, and in response to user selection of the selectable GUI element, generating, on the display device, a graphical representation based at least in part on the supplemental information.

In another embodiment, a computer-readable medium having computer-executable instructions stored thereon is provided. The computer-executable instructions, when executed by a processing system, cause the processing system to obtain a transcription of an audio communication with respect to a vehicle, generate, on a display device, a conversation log GUI display comprising a graphical representation of the transcription of the audio communication, analyze the transcription to identify an operational subject associated with the audio communication, obtain supplemental information pertaining to the operational subject from a data source, generate, on the conversation log GUI display, a selectable GUI element associated with the supplemental information, and in response to user selection of the selectable GUI element, generate, on the display device, a graphical representation based at least in part on the supplemental information.

In another embodiment, a system is provided that includes a display device, a data storage element to maintain a transcription of an audio communication with respect to a vehicle, and a processing system coupled to the display device and the data storage element to generate, on the display device, a conversation log GUI display comprising a graphical representation of the transcription of the audio communication, analyze the transcription to identify an operational subject associated with the audio communication, obtain supplemental information pertaining to the operational subject from a data source coupled to the processing system, generate, on the conversation log GUI display, a selectable GUI element associated with the supplemental information, and in response to user selection of the selectable GUI element, generate, on the display device, a graphical representation based at least in part on the supplemental information.

This summary is provided to describe select concepts in a simplified form that are further described in the detailed description. This summary is not intended to identify key or essential features of the claimed subject matter, nor is it intended to be used as an aid in determining the scope of the claimed subject matter.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Figure 1:
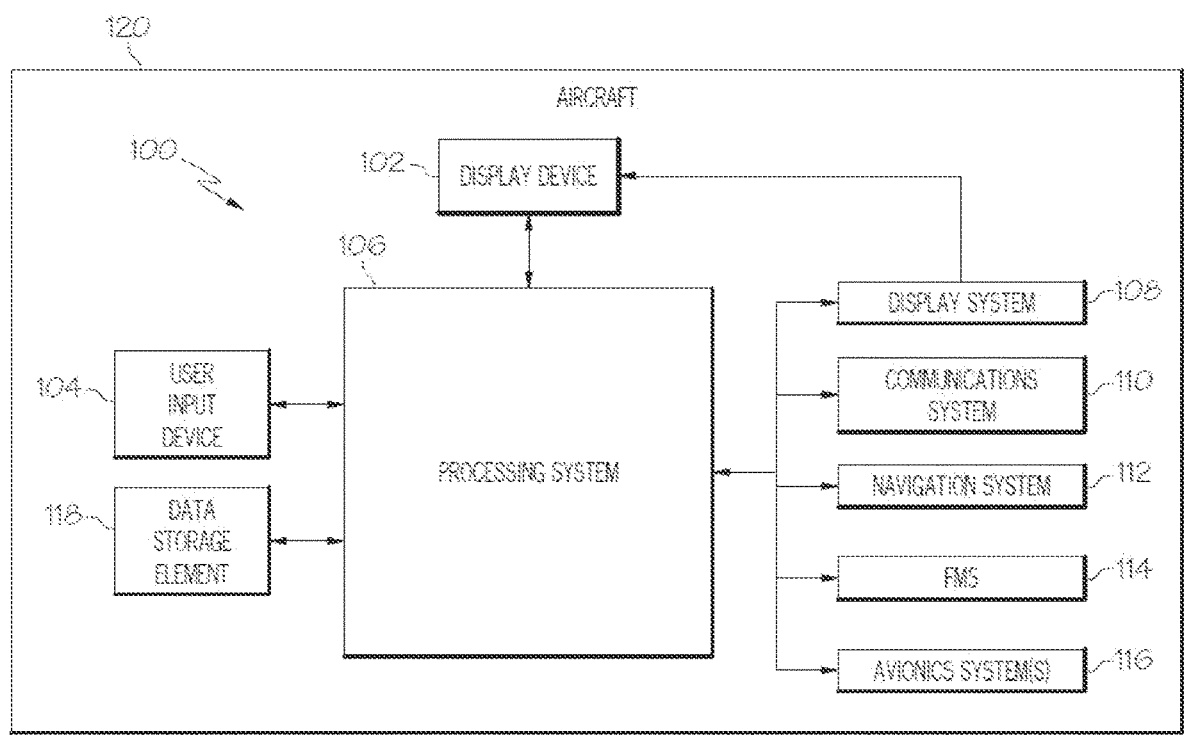
FIG. 1 is a block diagram illustrating a system suitable for use with a vehicle such as an aircraft in accordance with one or more exemplary embodiments.

The following detailed description is merely exemplary in nature and is not intended to limit the subject matter of the application and uses thereof. Furthermore, there is no intention to be bound by any theory presented in the preceding background, brief summary, or the following detailed description.

Embodiments of the subject matter described herein generally relate to systems and methods for supplementing or augmenting presentation of clearance communications and/or other audio communications associated with a vehicle with additional supplemental information pertaining to the audio communications received via one or more onboard systems. By supplementing the clearance communications with auxiliary information that may not be included or contained within the content of the clearance communications and consolidating information from different sources on a common display, head-down time may be reduced and situational awareness improved by enabling a vehicle operator to better understand the clearance communications and more quickly review or brief the supplemental information in one place, rather than having to locate and consult different displays, systems or components onboard the vehicle to obtain desired information missing from the clearance communications. For purposes of explanation, the subject matter is primarily described herein in the context of aircraft operating in a controlled airspace; however, the subject matter described herein is not necessarily limited to aircraft or avionic environments, and in alternative embodiments, may be implemented in an equivalent manner for ground operations, marine operations, or otherwise in the context of other types of vehicles and travel spaces.

As described in greater detail below primarily in the context of FIGS. 2-7, audio communications received at the aircraft are transcribed and the corresponding textual representation of the transcribed audio communications is graphically presented on a conversation log graphical user interface (GUI) display that includes graphical representations of the transcribed audio communications arranged in a sequential manner in accordance with the timestamps associated with the respective audio communications. The transcribed audio communications are also parsed and analyzed to automatically identify an operational subject of a respective audio communication with respect to the aircraft. For example, natural language processing (NLP), parts of speech tagging, semantic analysis and/or artificial intelligence (AI) techniques may be applied to the transcribed audio communications to ascertain the intent of a respective audio communication and identify the operational subjects or entities to which the respective audio communication pertains, such as, a particular aircraft or flight identifier, a runway, a taxiway, a waypoint, a heading, an altitude, a flight level, a communications radio or another avionics system or setting, an aircraft action (e.g., landing, takeoff, pushback, hold, or the like) and/or the like. Thereafter, the operational subject may be utilized as a search term or search key that is utilized to query one or more onboard systems, databases, remote systems or other potential data sources to obtain supplemental information pertaining to the identified operational subject.

When available supplemental information is identified from an available data source, a button or other selectable GUI element is rendered or otherwise generated on the conversation log GUI display in association with the graphical representation of the respective audio communication including the operational subject, for example, by rendering a button adjacent to the graphical representation of the transcribed audio communication to allow the pilot, co-pilot or other crew member to review the supplemental information. In response to user selection of the selectable GUI element, a graphical representation of the supplemental information or other graphical indicia influenced by the supplemental information is rendered or otherwise generated on the display, thereby allowing the pilot or other vehicle operator reviewing the transcribed ATC clearance communications on the conversation log GUI display to quickly access and view supplemental information relevant to the operational subject of a respective clearance communication.

For example, for an ATC clearance communication that includes an instruction to "exit via Bravo Five," taxiway B5 may be identified as the operational subject of the ATC clearance communication. In response to identifying taxiway B5 as the operational subject, an airport database or other navigational database may be queried to obtain supplemental information pertaining to taxiway B5, such, as, for example, the physical relationship of taxiway B5 with respect to the current runway, taxiway or other aircraft operational context (e.g., the second taxiway exit to the left of the current aircraft heading) and other restrictions or criteria associated with taxiway B5 (e.g., a designation as a rapid exit taxiway with a speed restriction of 80 knots). Thereafter, when the pilot or other crew member selects the button for supplemental information pertaining to the transcribed ATC clearance communication of "exit via Bravo Five" displayed on the conversation log GUI display, the display may be updated to include graphical representation of the supplemental information (e.g., "B5 is 2nd left exit and it is a Rapid Exit Taxiway with speed restriction of 80

Knots"), thereby notifying the pilot of when and where to expect taxiway B5 and how to operate the aircraft in anticipation of exiting via taxiway B5. In some embodiments, the graphical representation of the supplemental information may be realized as or otherwise include a navigational map, such as, for example, a map of the current airport (or a portion thereof) that includes a graphical representation of taxiway B5 in relation to a graphical representation of the current runway, the current taxiway and/or the current location of the aircraft, thereby allowing the pilot to visually ascertain the physical relationship of the taxiway using the displayed supplemental information.

As another example, for an ATC clearance communication of "expect traffic crossing FL 320," air traffic at flight level 320 may be identified as the operational subject of the ATC clearance communication. In response to identifying air traffic as the operational subject, an Automatic Dependent Surveillance-Broadcast (ADS-B) system or other traffic monitoring system may be queried to obtain supplemental information pertaining to air traffic operating in the vicinity of the ownship aircraft at flight level 320, such as, for example, the heading or direction of the air traffic relative to the ownship aircraft. Thereafter, when the pilot or other crew member selects the button for supplemental information pertaining to the transcribed ATC clearance communication of "expect traffic crossing FL 320" displayed on the conversation log GUI display, the display may be updated to include graphical representation of the supplemental information (e.g., "Traffic will be from 7 o'clock"), thereby notifying the pilot of where to expect the traffic in relation to the ownship aircraft.

As yet another example, for an ATC clearance communication of "cleared to take off, continue runway heading for 4NM then proceed filed departure procedure," the filed departure procedure may be identified as the operational subject of the instruction from ATC. In response, the flight management system (FMS) may be queried to identify the departure procedure that was previously filed, defined or otherwise associated with the current flight plan, and then retrieve corresponding supplemental information associated with that departure procedure from the FMS or another data source (e.g., an airport database or other navigational database). Thereafter, when the pilot or other crew member selects the button for supplemental information pertaining to the transcribed ATC instruction displayed on the conversation log GUI display, the display may be updated to include graphical representation of the supplemental information that identifies or otherwise pertains to the filed departure procedure (e.g., "Departure Procedure KENT5, Transition at waypoint KENT").

As yet another example, for an ATC clearance communication of "after climbing to 4000 feet, turn left immediately," semantic analysis (e.g., using NLP and/or AI) may be performed to ascertain, based on the intent of the instruction, that the operational subject of the communication is terrain or an obstacle in a vicinity of the flight path. Thereafter, one or more of a terrain database, a navigational map database, an obstacle database, an Enhanced Ground Proximity Warning System (EGPWS) and/or the like may be queried to identify the likely terrain or obstacle of interest and obtain additional information pertaining to the identified terrain or obstacle. Thereafter, when the pilot or other crew member selects the button for supplemental information pertaining to the transcribed ATC instruction displayed on the conversation log GUI display, the display may be updated to include a map depicting the terrain or obstacle of interest or another graphical representation of the supplemental information pertaining to the operational subject providing the rationale for the instruction (e.g., "Turn left immediately due to rising terrain ahead of runway in 10 NM").

It should be appreciated that the subject matter described herein is not limited to any particular type or number of data sources from which supplemental information may be obtained. In this regard, in addition to potential onboard sources (e.g., onboard avionics, locally-maintained databases, etc.), any number of different remote or external systems may be utilized to obtain supplemental information, such as, for example, external weather monitoring system(s) (e.g., a Doppler radar monitoring system, a collaborative convective forecast product (CCFP) or national convective weather forecast (NCWF) system, an infrared satellite system, etc.) or other external reporting systems (e.g., a Notice to Airmen (NOTAM) system, a Pilot Reporting (PIREP) system, or the like). For example, for an ATC clearance communication of "cleared to land on runway 22L," runway 22L may be identified as the operational subject and used as a key or search term to query a database of NOTAMs to obtain supplemental information pertaining to runway 22L that could be displayed in response to user selection (e.g., "Runway 22L length Reduced to 3000 m from 3500 m").

FIG. 1 depicts an exemplary embodiment of a system 100 which may be utilized with a vehicle, such as an aircraft 120. In an exemplary embodiment, the system 100 includes, without limitation, a display device 102, one or more user input devices 104, a processing system 106, a display system 108, a communications system 110, a navigation system 112, a flight management system (FMS) 114, one or more avionics systems 116, and a data storage element 118 suitably configured to support operation of the system 100, as described in greater detail below.

In exemplary embodiments, the display device 102 is realized as an electronic display capable of graphically displaying flight information or other data associated with operation of the aircraft 120 under control of the display system 108 and/or processing system 106. In this regard, the display device 102 is coupled to the display system 108 and the processing system 106, and the processing system 106 and the display system 108 are cooperatively configured to display, render, or otherwise convey one or more graphical representations or images associated with operation of the aircraft 120 on the display device 102. The user input device 104 is coupled to the processing system 106, and the user input device 104 and the processing system 106 are cooperatively configured to allow a user (e.g., a pilot, co-pilot, or crew member) to interact with the display device 102 and/or other elements of the system 100, as described in greater detail below. Depending on the embodiment, the user input device(s) 104 may be realized as a keypad, touchpad, keyboard, mouse, touch panel (or touchscreen), joystick, knob, line select key or another suitable device adapted to receive input from a user. In some exemplary embodiments, the user input device 104 includes or is realized as an audio input device, such as a microphone, audio transducer, audio sensor, or the like, that is adapted to allow a user to provide audio input to the system 100 in a "hands free" manner using speech recognition.

The processing system 106 generally represents the hardware, software, and/or firmware components configured to facilitate communications and/or interaction between the elements of the system 100 and perform additional tasks and/or functions to support operation of the system 100, as described in greater detail below. Depending on the embodiment, the processing system 106 may be implemented or realized with a general purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 106 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 106 includes processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processing system 106, or in any practical combination thereof. For example, in one or more embodiments, the processing system 106 includes or otherwise accesses a data storage element (or memory), which may be realized as any sort of non-transitory short or long term storage media capable of storing programming instructions for execution by the processing system 106. The code or other computer-executable programming instructions, when read and executed by the processing system 106, cause the processing system 106 to support or otherwise perform certain tasks, operations, functions, and/or processes described herein.

The display system 108 generally represents the hardware, software, and/or firmware components configured to control the display and/or rendering of one or more navigational maps and/or other displays pertaining to operation of the aircraft 120 and/or onboard systems 110, 112, 114, 116 on the display device 102. In this regard, the display system 108 may access or include one or more databases suitably configured to support operations of the display system 108, such as, for example, a terrain database, an obstacle database, a navigational database, a geopolitical database, an airport database, a terminal airspace database, a special use airspace database, or other information for rendering and/or displaying navigational maps and/or other content on the display device 102.

In the illustrated embodiment, the aircraft system 100 includes a data storage element 118, which is capable of storing, maintaining or otherwise implementing one or more of the databases that support operations of the aircraft system 100 described herein. In some embodiments, the data storage element 118 contains aircraft procedure information (or instrument procedure information) for a plurality of airports and maintains association between the aircraft procedure information and the corresponding airports. Depending on the embodiment, the data storage element 118 may be physically realized using RAM memory, ROM memory, flash memory, registers, a hard disk, or another suitable data storage medium known in the art or any suitable combination thereof. As used herein, aircraft procedure information should be understood as a set of operating parameters, constraints, or instructions associated with a particular aircraft action (e.g., approach, departure, arrival, climbing, and the like) that may be undertaken by the aircraft 120 at or in the vicinity of a particular airport. An airport should be understood as referring to any sort of location suitable for landing (or arrival) and/or takeoff (or departure) of an aircraft, such as, for example, airports, runways, landing strips, and other suitable landing and/or departure locations, and an aircraft action should be understood as referring to an approach (or landing), an arrival, a departure (or takeoff), an ascent, taxiing, or another aircraft action having associated aircraft procedure information. An airport may have one or more predefined aircraft procedures associated therewith, wherein the aircraft procedure information for each aircraft procedure at each respective airport are maintained by the data storage element 118 in association with one another.

Depending on the embodiment, the aircraft procedure information may be provided by or otherwise obtained from a governmental or regulatory organization, such as, for example, the Federal Aviation Administration in the United States. In an exemplary embodiment, the aircraft procedure information comprises instrument procedure information, such as instrument approach procedures, standard terminal arrival routes, instrument departure procedures, standard instrument departure routes, obstacle departure procedures, or the like, traditionally displayed on a published charts, such as Instrument Approach Procedure (IAP) charts, Standard Terminal Arrival (STAR) charts or Terminal Arrival Area (TAA) charts, Standard Instrument Departure (SID) routes, Departure Procedures (DP), terminal procedures, approach plates, and the like. In exemplary embodiments, the data storage element 118 maintains associations between prescribed operating parameters, constraints, and the like and respective navigational reference points (e.g., waypoints, positional fixes, radio ground stations (VORs, VORTACs, TACANs, and the like), distance measuring equipment, non-directional beacons, or the like) defining the aircraft procedure, such as, for example, altitude minima or maxima, minimum and/or maximum speed constraints, RTA constraints, and the like. In this regard, although the subject matter may be described in the context of a particular procedure for purpose of explanation, the subject matter is not intended to be limited to use with any particular type of aircraft procedure and may be implemented for other aircraft procedures in an equivalent manner.

Still referring to FIG. 1, in exemplary embodiments, the processing system 106 is coupled to the navigation system 112, which is configured to provide real-time navigational data and/or information regarding operation of the aircraft 120. The navigation system 112 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 112, as will be appreciated in the art. The navigation system 112 is capable of obtaining and/or determining the instantaneous position of the aircraft 120, that is, the current (or instantaneous) location of the aircraft 120 (e.g., the current latitude and longitude) and the current (or instantaneous) altitude or above ground level for the aircraft 120. The navigation system 112 is also capable of obtaining or otherwise determining the heading of the aircraft 120 (i.e., the direction the aircraft is traveling in relative to some reference). In the illustrated embodiment, the processing system 106 is also coupled to the communications system 110, which is configured to support communications to and/or from the aircraft 120. For example, the communications system 110 may support communications between the aircraft 120 and air traffic control or another suitable command center or ground location. In this regard, the communications system 110 may be realized using a radio communication system and/or another suitable data link system.

In exemplary embodiments, the processing system 106 is also coupled to the FMS 114, which is coupled to the navigation system 112, the communications system 110, and one or more additional avionics systems 116 to support navigation, flight planning, and other aircraft control functions in a conventional manner, as well as to provide real-time data and/or information regarding the operational status of the aircraft 120 to the processing system 106. Although FIG. 1 depicts a single avionics system 116, in practice, the system 100 and/or aircraft 120 will likely include numerous avionics systems for obtaining and/or providing real-time flight-related information that may be displayed on the display device 102 or otherwise provided to a user (e.g., a pilot, a co-pilot, or crew member). For example, practical embodiments of the system 100 and/or aircraft 120 will likely include one or more of the following avionics systems suitably configured to support operation of the aircraft 120: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

It should be understood that FIG. 1 is a simplified representation of the system 100 for purposes of explanation and ease of description, and FIG. 1 is not intended to limit the application or scope of the subject matter described herein in any way. It should be appreciated that although FIG. 1 shows the display device 102, the user input device 104, and the processing system 106 as being located onboard the aircraft 120 (e.g., in the cockpit), in practice, one or more of the display device 102, the user input device 104, and/or the processing system 106 may be located outside the aircraft 120 (e.g., on the ground as part of an air traffic control center or another command center) and communicatively coupled to the remaining elements of the system 100 (e.g., via a data link and/or communications system 110). Similarly, in some embodiments, the data storage element 118 may be located outside the aircraft 120 and communicatively coupled to the processing system 106 via a data link and/or communications system 110. Furthermore, practical embodiments of the system 100 and/or aircraft 120 will include numerous other devices and components for providing additional functions and features, as will be appreciated in the art. In this regard, it will be appreciated that although FIG. 1 shows a single display device 102, in practice, additional display devices may be present onboard the aircraft 120. Additionally, it should be noted that in other embodiments, features and/or functionality of processing system 106 described herein can be implemented by or otherwise integrated with the features and/or functionality provided by the FMS 114. In other words, some embodiments may integrate the processing system 106 with the FMS 114. In yet other embodiments, various aspects of the subject matter described herein may be implemented by or at an electronic flight bag (EFB) or similar electronic device that is communicatively coupled to the processing system 106 and/or the FMS 114.

Figure 2:
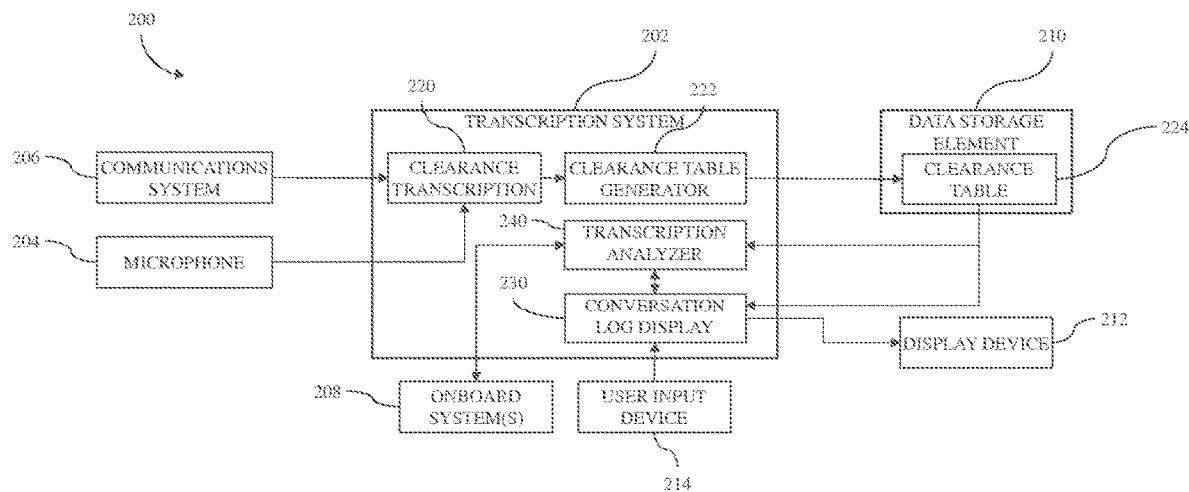
FIG. 2 is a block diagram illustrating a speech recognition system suitable for use with the aircraft system of FIG. 1 in accordance with one or more exemplary embodiments.

FIG. 2 depicts an exemplary embodiment of a speech recognition system 200 for transcribing speech, voice commands or any other received audio communications (e.g., audio broadcasts received from the automatic terminal information service (ATIS)). In one or more exemplary embodiments, the speech recognition system 200 is implemented or otherwise provided onboard a vehicle, such as aircraft 120; however, in alternative embodiments, the speech recognition system 200 may be implemented independent of any aircraft or vehicle, for example, at an EBB distinct from the aircraft or at a ground location such as an air traffic control facility. That said, for purposes of explanation, the speech recognition system 200 may be primarily described herein in the context of an implementation onboard an aircraft. The illustrated speech recognition system 200 includes a transcription system 202, an audio input device 204 (or microphone) and one or more communications systems 206 (e.g., communications system 110). The transcription system 202 may also be coupled to one or more onboard systems 208 (e.g., one or more avionics systems 108, 110, 112, 114, 116) to receive data messages for concurrent presentation with transcribed audio communications on a common GUI display on a display device 212 (e.g., display device 102). It should be understood that FIG. 2 is a simplified representation of the speech recognition system 200 for purposes of explanation and ease of description, and FIG. 2 is not intended to limit the application or scope of the subject matter described herein in any way.

The transcription system 202 generally represents the processing system or component of the speech recognition system 200 that is coupled to the microphone 204 and communications system(s) 206 to receive or otherwise obtain audio clearance communications and other audio communications, analyze the audio content of the clearance communications, and transcribe the audio content of the clearance communications, as described in greater detail below. Depending on the embodiment, the transcription system 202 may be implemented as a separate standalone hardware component, while in other embodiments, the features and/or functionality of the transcription system 202 may be integrated with and/or implemented using another processing system (e.g., processing system 106). In this regard, the transcription system 202 may be implemented using any sort of hardware, firmware, circuitry and/or logic components or combination thereof. For example, depending on the embodiment, the transcription system 202 may be realized as a general purpose processor, a content addressable memory, a digital signal processor, an application specific integrated circuit, a field programmable gate array, any suitable programmable logic device, discrete gate or transistor logic, processing core, a combination of computing devices (e.g., a plurality of processing cores, a combination of a digital signal processor and a microprocessor, a plurality of microprocessors, one or more microprocessors in conjunction with a digital signal processor core, or any other such configuration), discrete hardware components, or any combination thereof, designed to perform the functions described herein.

The audio input device 204 generally represents any sort of microphone, audio transducer, audio sensor, or the like capable of receiving voice or speech input. In this regard, in one or more embodiments, the audio input device 204 is realized as a microphone (e.g., user input device 104) onboard the aircraft 120 to receive voice or speech annunciated by a pilot or other crewmember onboard the aircraft 120 inside the cockpit of the aircraft 120. The communications system(s) 206 (e.g., communications system 110) generally represent the avionics systems capable of receiving clearance communications from other external sources, such as, for example, other aircraft, an air traffic controller, or the like. Depending on the embodiment, the communications system(s) 206 could include one or more of a very high frequency (VHF) radio communications system, a controller-pilot data link communications (CPDLC) system, an aeronautical operational control (AOC) communications system, an aircraft communications addressing and reporting system (ACARS), and/or the like.

In exemplary embodiments, computer-executable programming instructions are executed by the processor, control module, or other hardware associated with the transcription system 202 and cause the transcription system 202 to generate, execute, or otherwise implement a clearance transcription application 220 capable of analyzing, parsing, or otherwise processing voice, speech, or other audio input received by the transcription system 202 to convert the received audio content (or audio signals) into a corresponding textual representation. In this regard, the clearance transcription application 220 may implement or otherwise support a speech recognition engine (or voice recognition engine) or other speech-to-text system. Accordingly, the transcription system 202 may also include various filters, analog-to-digital converters (ADCs), or the like, and the transcription system 202 may include or otherwise access a data storage element 210 (or memory) that stores a speech recognition vocabulary for use by the clearance transcription application 220 in converting audio inputs into transcribed textual representations. In one or more embodiments, the clearance transcription application 220 may also mark, tag, or otherwise associate a transcribed textual representation of a clearance communication with an identifier or other indicia of the source of the clearance communication (e.g., the onboard microphone 204, a radio communications system 206, or the like).

In exemplary embodiments, the computer-executable programming instructions executed by the transcription system 202 also cause the transcription system 202 to generate, execute, or otherwise implement a clearance table generation application 222 (or clearance table generator) that receives the transcribed textual clearance communications from the clearance transcription application 220 or receives clearance communications in textual form directly from a communications system 206 (e.g., a CPDLC system). The clearance table generator 222 parses or otherwise analyzes the textual representation of the received clearance communications and generates corresponding clearance communication entries in a table 224 in the memory 210. In this regard, the clearance table 224 maintains all of the clearance communications received by the transcription system 202 from either the onboard microphone 204 or an onboard communications system 206.

In exemplary embodiments, for each clearance communication received by the clearance table generator 222, the clearance table generator 222 parses or otherwise analyzes the textual content of the clearance communication using natural language processing (NLP), parts of speech tagging, artificial intelligence (AI) or other suitable techniques and attempts to extract or otherwise identify, if present, one or more of an identifier contained within the clearance communication (e.g., a flight identifier, call sign, or the like), an operational subject of the clearance communication (e.g., a runway, a taxiway, a waypoint, a heading, an altitude, a flight level, or the like), an operational parameter value associated with the operational subject in the clearance communication (e.g., the runway identifier, taxiway identifier, waypoint identifier, heading angle, altitude value, or the like), and/or an action associated with the clearance communication (e.g., landing, takeoff, pushback, hold, or the like). The clearance table generator 222 also identifies the radio frequency or communications channel associated with the clearance communication and attempts to identify or otherwise determine the source of the clearance communication. The clearance table generator 222 then creates or otherwise generates an entry in the clearance table 224 that maintains an association between the textual content of the clearance communication and the identified fields associated with the clearance communication. Additionally, the clearance table generator 222 may analyze the new clearance communication entry relative to existing clearance communication entries in the clearance table 224 to identify or otherwise determine a conversational context to be assigned to the new clearance communication entry (e.g., whether a given communication corresponds to a request, a response, an acknowledgment, and/or the like).

Still referring to FIG. 2, in one or more embodiments, the processor, control module, or other hardware associated with the transcription system 202 executes computer-executable programming instructions that cause the transcription system 202 to generate, execute, or otherwise implement a conversation log display application 230 capable of generating or otherwise providing a conversation log GUI display that includes graphical representations of the transcribed audio communications from the clearance table 224 in a sequential, time-ordered manner. In some implementations, the conversation log GUI display may also be interspersed with graphical representations of data messages, text messages and/or other messages received via one or more onboard system(s) 208.

In exemplary embodiments, the processor, control module, or other hardware associated with the transcription system 202 executes computer-executable programming instructions that also cause the transcription system 202 to generate, execute, or otherwise implement a transcription analysis application 240 (or transcription analyzer) capable of analyzing the transcribed audio communications or other messages to be presented on the conversation log GUI display to identify or otherwise obtain the operational subject of a respective communication and retrieve supplemental information pertaining to the operational subject from one or more onboard system 208. When supplemental information for an operational subject is identified or otherwise determined, the transcription analyzer 240 provides a corresponding indication to the conversation log display application 230 which is cooperatively configured with the transcription analyzer 240 to generate or otherwise provide a selectable GUI element to be associated with the supplemental information for the respective communication on the conversation log GUI display in spatial, visual or graphical association with the graphical representation of the respective communication. For example, the conversation log display application 230 may generate a button associated with presentation of supplemental information associated with a received ATC clearance communication adjacent to the graphical representation of the transcription of the received ATC clearance communication.

As described in greater detail below, in one or more exemplary embodiments, in response to user selection of the supplemental information GUI element, the conversation log display application 230 and the transcription analyzer 240 are cooperatively configured to generate a supplemental information GUI display on the display device 212 that includes a graphical representation of the supplemental information associated with the respective communication. In this manner, the pilot or other user reviewing past communications on the conversation log GUI display may quickly and easily toggle the state of the display device 212 from depicting the conversation log GUI display to depicting a supplemental information GUI display to review supplemental information associated with a preceding communication of interest to the pilot. In this regard, in some embodiments, the supplemental information GUI display may be displayed on, overlying or in lieu of the conversation log GUI display on the display device 212. That said, in other embodiments, the supplemental information GUI display may be displayed as an inset within the conversation log GUI display or otherwise be incorporated into the conversation log GUI display such that selection of the supplemental information GUI element results in the conversation log GUI display dynamically updating to include the supplemental information GUI display within the display area occupied by the conversation log GUI display, for example, by substituting the supplemental information GUI display for the supplemental information GUI element at the corresponding position within the depicted sequence of clearance communications.

Figure 3:
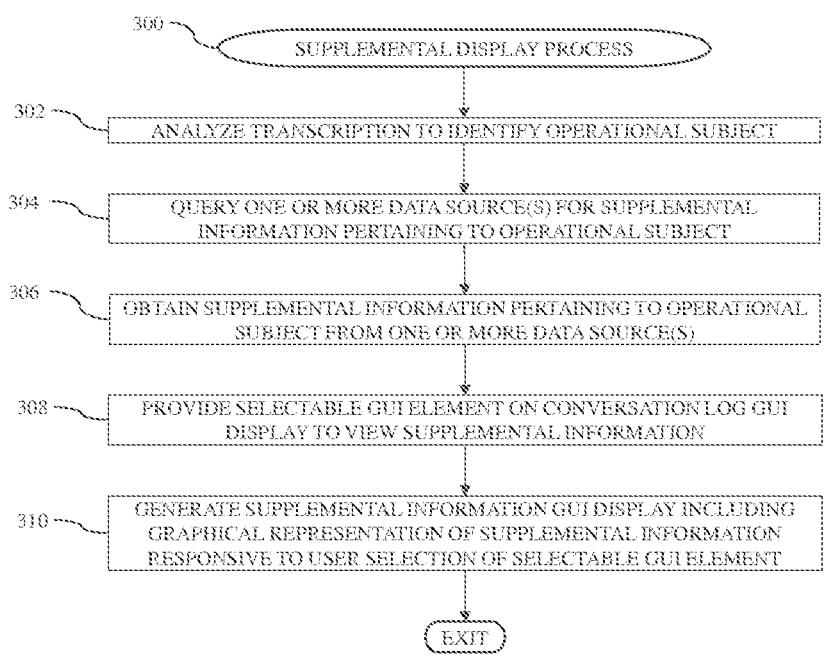
FIG. 3 is a flow diagram of a supplemental display process suitable for implementation by the speech recognition system of FIG. 2 in the aircraft system of FIG. 1 in one or more exemplary embodiments.

FIG. 3 depicts an exemplary embodiment of a supplemental display process 300 suitable for implementation by an aircraft system to provide a supplemental information GUI display that includes graphical representations of supplemental information related to transcribed audio communications or other communications (e.g., data messages). The various tasks performed in connection with the illustrated process may be implemented using hardware, firmware, software executed by processing circuitry, or any combination thereof. For illustrative purposes, the following description may refer to elements mentioned above in connection with FIGS. 1-2. In practice, portions of the supplemental display process 300 may be performed by different elements of the aircraft system 100. That said, exemplary embodiments are described herein in the context of the supplemental display process 300 being primarily performed by the conversation log display application 230 and/or the transcription analyzer 240 at the transcription system 202 and/or the processing system 106. It should be appreciated that the supplemental display process 300 may include any number of additional or alternative tasks, the tasks need not be performed in the illustrated order and/or the tasks may be performed concurrently, and/or the supplemental display process 300 may be incorporated into a more comprehensive procedure or process having additional functionality not described in detail herein. Moreover, one or more of the tasks shown and described in the context of FIG. 3 could be omitted from a practical embodiment of the supplemental display process 300 as long as the intended overall functionality remains intact.

Referring to FIG. 3 with continued reference to FIGS. 1-2, in exemplary embodiments, the supplemental display process 300 is performed in connection with presentation of a conversation log GUI display on a display device 102, 212 that includes graphical representations of transcribed ATC clearance communications and/or other received audio communications that are sequentially arranged in a chronological or time-ordered manner. For example, the conversation log GUI display may be configurable to depict graphical representations of the transcribed audio communications corresponding to entries in the clearance table 224 where the ownship aircraft was the sender or intended recipient of the audio communications in a manner that allows a pilot or other user to scroll through the transcribed communications to review individual communications chronologically in the context of the ongoing conversation. In this regard, the conversation log GUI display may depict only a limited subset of the most recent communications based on the available display area allocated to a presentation region of the conversation log GUI display in concert with a scroll bar, slider or similar GUI element that allows the user to view older communications within the presentation region of the conversation log GUI display. In some implementations, other messages received outside of the audio communications (e.g., data messages) may be integrated into the conversation log GUI display in a chronological manner that reflects the temporal context of the messages with respect to the conversation context, thereby providing a more coherent and comprehensive understanding of the various communications received at or by various different systems onboard the aircraft. Thus, a pilot or other user is alleviated of the mental burden of synthesizing and chronologizing the communications.

In exemplary embodiments, the supplemental display process 300 analyzes the text of transcribed audio communications to identify or otherwise determine the operational subject of the communication (task 302). For example, as described above, the transcription system 202 (e.g., the clearance table generator 222 and/or the transcription analyzer 240) utilizes parts of speech tagging, semantic analysis, NLP and/or AI techniques to parse the textual representation of the content of a communication to determine the operational subject of the communication and/or the operational objective or intent of the communication from which the operational subject can be derived or determined. In some embodiments, the transcription system 202 identifies or otherwise obtains current status information indicative of the current, real-time operational context associated with the aircraft from one or more onboard systems 208 (e.g., the current flight phase, the current aircraft configuration, the current aircraft altitude, the current heading, the current speed and/or the like) and utilizes the current operational context in connection with the analysis of the transcription to identify the operational subject that is consistent with the current operational context. In this manner, the transcription system 202 identifies the particular airport, runway, taxiway, waypoint, avionics system or setting, aircraft procedure, aircraft action (e.g., landing, takeoff, pushback, hold, or the like), parameter (e.g., heading, altitude, flight level, etc.) or other feature of interest (e.g., air traffic, terrain, obstacles, airspaces, etc.) related to operation of the aircraft 120 that is the subject of the respective communication.

After identifying the operational subject of a particular communication, the supplemental display process 300 utilizes the identification of the operational subject as a search term or key to search or otherwise query one or more data sources for available supplemental information pertaining to the operational subject and then retrieves or otherwise obtains the supplemental information pertaining to the operational subject from the data source(s) (tasks 304, 306). For example, for each clearance communication in the clearance table 224 that pertains to the ownship aircraft 120 (e.g., the ownship aircraft 120 is the sender or the intended recipient), the transcription analyzer 240 may utilize identifying information associated with the operational subject identified for that respective clearance communication to retrieve supplemental information pertaining to the operational subject via one or more onboard systems 208. In one or more embodiments, the transcription analyzer 240 updates the entry for the respective clearance communication in the clearance table 224 to include the retrieved supplemental information retrieved via the onboard system(s) 208, thereby maintaining the retrieved supplemental information in association with the transcription of the respective clearance communication.

In some implementations, the transcription analyzer 240 may determine the type of operational subject invoked by the clearance communication, and then identify the particular onboard system(s) 208 to be queried given the type of operational subject. For example, when the operational subject is a runway or taxiway, the transcription analyzer 240 may obtain supplemental information pertaining to the runway or taxiway from an airport database or a similar data storage element (e.g., by querying the display system 108 or a database 118 using the identifier associated with the runway or taxiway and the identifier for the particular airport associated with the respective runway or taxiway). Additionally, the transcription analyzer 240 may attempt to obtain real-time information pertaining to the particular runway or taxiway, for example, by querying or otherwise searching available NOTAMs and/or PIREPs (e.g., by querying an onboard system or a remote system maintaining NOTAMs and/or PIREPs) or an automated terminal information service (ATIS) for real-time information pertaining to the particular runway or taxiway. On the other hand, when the operational subject is realized as a waypoint or aircraft procedure likely to be related to the flight plan, the transcription analyzer 240 may query the FMS 114, the navigation system 112 and/or other avionics system 116 maintaining information pertaining to the flight plan to obtain supplemental information pertaining to the particular waypoint or aircraft procedure. That said, it will be appreciated that the subject matter is not limited to any particular type or number of data sources that may be queried for potential supplemental information.

Referring to FIG. 2 with reference to FIG. 3, in one or more embodiments, the clearance table 224 including transcriptions of preceding clearance communications may be utilized as the data source from which to obtain supplemental information. For example, the transcription analyzer 240 may analyze preceding clearance communications associated with a particular airspace or operating region associated with the same ATC to identify values for operational parameters or other information associated with the operational subject that were previously communicated or assigned by the ATC for use as supplemental information for a subsequent clearance communication. Thus, in scenarios where the ATC may fail to communicate some particular piece of information that is absent from the particular clearance communication of interest, the transcription analyzer 240 may utilize preceding clearance communications to identify or otherwise derive supplemental information pertaining to the operational subject to the more recent clearance communication, thereby allowing the pilot or other user to obtain the supplemental information without reviewing preceding clearance communications between the ATC and other aircraft operating in the same airspace or region.

Referring again to FIG. 3 with continued reference to FIGS. 1-2, when supplemental information pertaining to the operational subject of a communication is identified, the supplemental display process 300 generates or otherwise provides a selectable GUI element on the conversation log GUI display for viewing the supplemental information associated with the respective communication in visual or graphical association with the graphical representation of the respective communication (task 308). For example, in response to identifying supplemental information associated with a transcribed clearance communication in the clearance table 224 or receiving indicia of available supplemental information from the transcription analyzer 240, the conversation log display application 230 may automatically render or otherwise generate a button or similar selectable GUI element on the conversation log GUI display adjacent to or otherwise in visual or graphical association with the graphical representation of the textual content of the transcribed clearance communication on the conversation log GUI display. In this regard, in exemplary embodiments, the position or physical relationship of the selectable GUI element on the conversation log GUI display in relation to the graphical representations of preceding and/or subsequent transcribed clearance communication may be configured to preserve or otherwise maintain the sequential, chronological ordering of the conversation log GUI display, for example, by positioning the selectable GUI element in alignment with the graphical representation of the textual content of the transcribed clearance communication to which it belongs or sequentially between the graphical representation of the textual content of the transcribed clearance communication and the graphical representation of a preceding and/or subsequent transcribed clearance communication.

In response to selection of the selectable GUI element, the supplemental display process 300 generates, renders or otherwise provides a supplemental information GUI display on the display device that includes a graphical representation of the retrieved supplemental information associated with the operational subject of the communication (task 310). In some embodiments, the conversation log display application 230 generates the supplemental information GUI display as a separate GUI display overlying or in lieu of the conversation log GUI display, where the contents of the supplemental information GUI display include a graphical representation of the supplemental information associated with the respective transcribed clearance communication obtained from the clearance table 224 and/or the onboard system(s) 206 via the transcription analyzer 240. That said, in other implementations, the conversation log display application 230 generates the supplemental information GUI display as a window or other inset within the conversation log GUI display or overlying only a portion of the conversation log GUI display, such that at least some of the graphical representations of the transcribed clearance communications are maintained visible on the adjacent or underlying conversation log GUI display while the supplemental information GUI display is concurrently presented.

Depending on the embodiment, the type of operational subject and/or the type of supplemental information available, the contents of the supplemental information GUI display may include any sort or combination of text, graphics or other imagery. For example, in some embodiments, the supplemental information GUI display may include a navigational map that includes or otherwise depicts the supplemental information associated with the operational subject of a respective transcribed ATC clearance communication on the navigational map. In this regard, the navigational map depicted in the supplemental information GUI display may also include a graphical representation of the operational subject on or overlying the navigational map, and in some embodiments, the navigational map may be centered on the operational subject (e.g., the graphical representation of the operational subject is rendered at the center of the navigational map). Accordingly, it will be appreciated that the subject matter described herein is not limited to any particular type, amount or combination of graphical content that may be rendered or displayed within the supplemental information GUI display.

Figure 5:
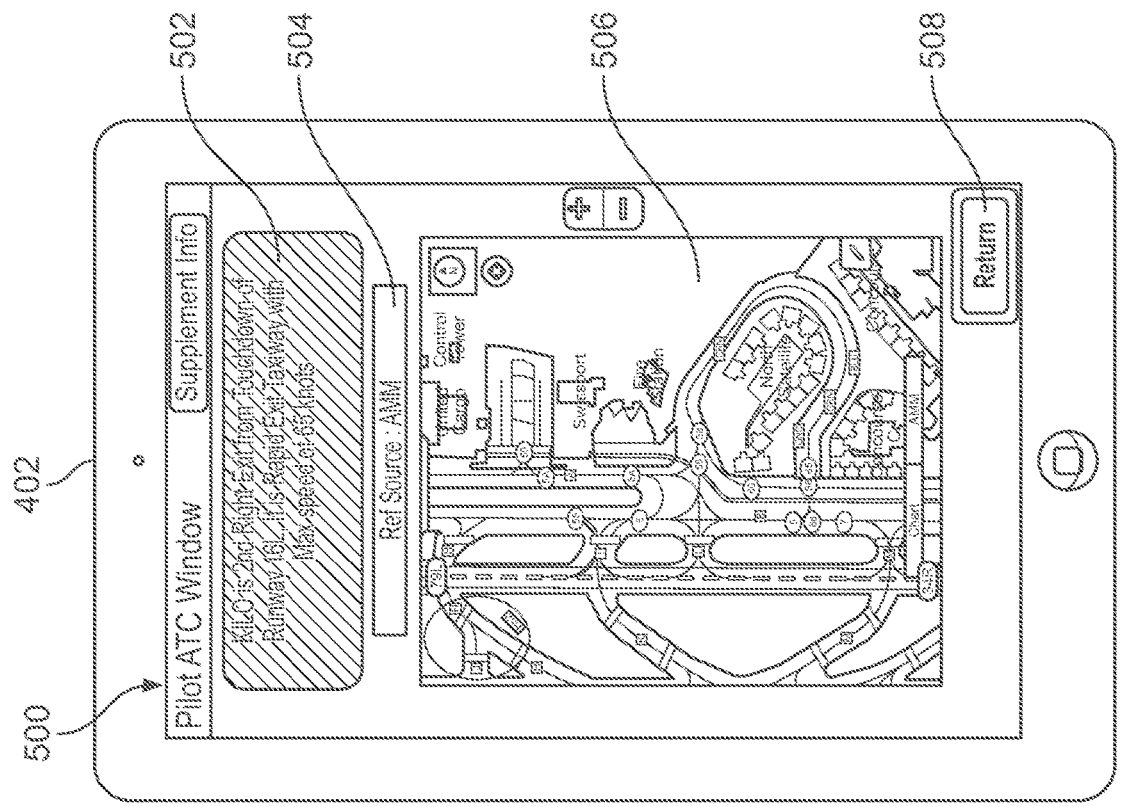
FIGS. 4-9 depict exemplary sequences of a conversation log graphical user interface (GUI) display and a corresponding supplemental information GUI display suitable for presentation on a display device in the system of FIG. 1 or FIG. 2 in connection with the supplemental display process of FIG. 3 in accordance with one or more exemplary embodiments.
Figure 4:
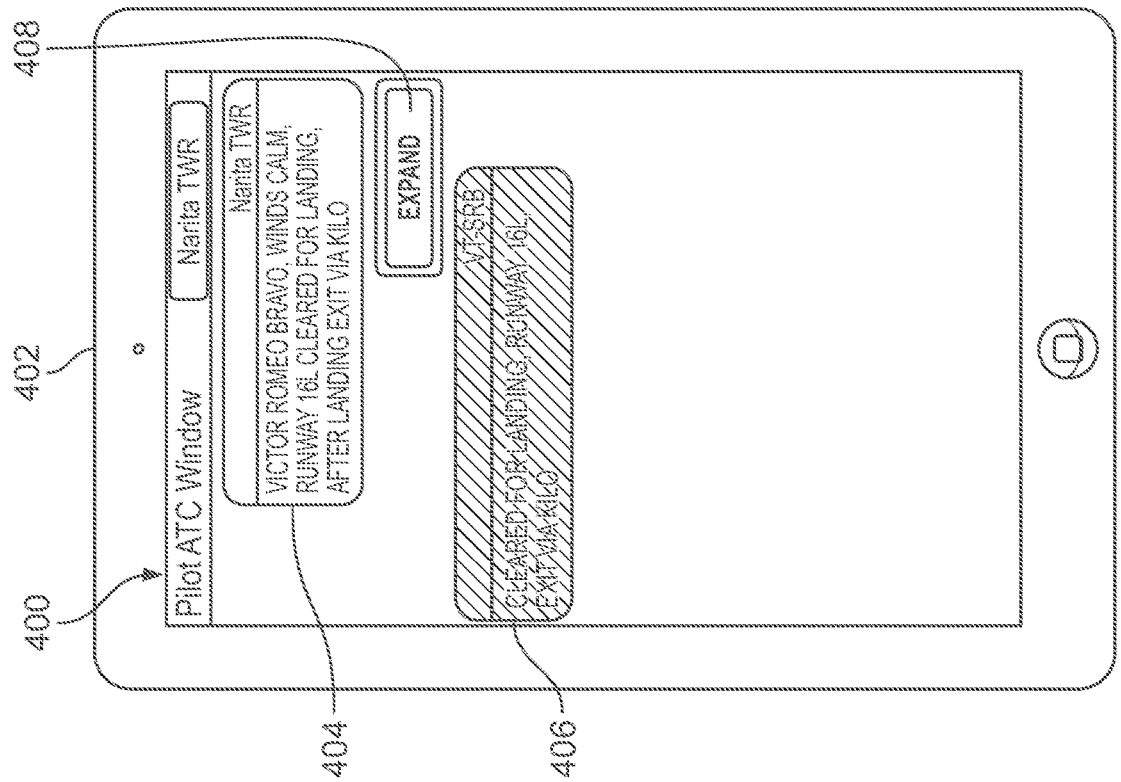

FIGS. 4-5 depict an exemplary sequence of a conversation log GUI display 400 and supplemental information GUI display 500 that may be depicted on a display associated with an electronic device 402 in connection with the supplemental display process 300 of FIG. 3. In this regard, the electronic device 402 could be realized as any sort of client electronic device, such as, for example, an EFB, a mobile phone, a smartphone, a tablet computer, a laptop computer, and/or the like. In yet other embodiments, the electronic device 402 could be realized as a multi-function control and display unit (MCDU), a display device 102 incorporated to a flight deck of an aircraft 120, or another hardware component of an onboard system 108, 110, 112, 114, 116, 208 that is incorporated with the flight deck or cockpit of the aircraft 120.

The conversation log GUI display 400 includes graphical representations of transcribed audio ATC communications 404, 406 presented in a top-down chronological order, such that more recent audio communications are depicted below preceding audio communications, with the newest or most recent audio communication at or near the bottom of the conversation log GUI display 400, and the oldest or least recent audio communication at or near the top of the conversation log GUI display 400. In this regard, as audio communications are received, the conversation log GUI display 400 effectively scrolls downward to maintain the most recent audio communications displayed within the presentation region (or window) of the conversation log GUI display 400 while graphical representations of older audio communications advance upward out of the presentation region. In this regard, the conversation log GUI display 400 may include a slider or similar GUI element adapted to allow the pilot or other user to adjust the positioning of the presentation region to encompass graphical representations of a particular subset of previously-received audio communications. In the illustrated embodiment, the graphical representations 404, 406 of the transcribed audio ATC communications issued by the ATC or other external source are rendered at or along first side or edge of the conversation log GUI display 400, 500 using one or more visually distinguishable graphical characteristics (e.g., color, font, shading and/or the like) to convey the depicted communications 406 are associated with another source external to the ownship aircraft 120, while graphical representations of any transcribed audio ATC communications issued by the pilot or other user onboard the ownship aircraft 120 may be rendered at or along an opposing side or edge of the conversation log GUI display 400 using one or more different visually distinguishable graphical characteristics to convey the depicted communications 404 are associated with the ownship aircraft 120 as the source of the depicted communications. In this regard, the conversation log GUI display 400 may also include text or other indicia of the source of the depicted communications 404, 406 (e.g., PHX-TWR) along with the timestamps associated with receipt of the respective communications 404, 406.

FIG. 4 depicts a state of the conversation log GUI display 400 after the supplemental display process 300 has identified taxiway KILO as the operational subject of the depicted transcribed ATC clearance communication 406 (e.g., task 302), obtained supplemental information associated with the KILO taxiway (e.g., tasks 304, 306) and generated a corresponding button 408 on the conversation log GUI display 400 adjacent to the depicted clearance communication 406 to which the retrieved supplemental belongs (e.g., task 308). For example, as described above, after identifying the taxiway KILO as the operational subject, the transcription analyzer 240 may query an onboard system 208 including a navigational map database (e.g., display system 108, data storage element 118, etc.) for supplemental information pertaining to taxiway KILO using the KILO taxiway identifier as part of the search term or key for locating and retrieving the information.

In response to user selection of the expand button 408 to view the supplemental information associated with the transcribed ATC clearance communication 406, the supplemental display process 300 dynamically updates the display of the electronic device 402 to include the supplemental information GUI display 500 in lieu of the conversation log GUI display 400. The supplemental information GUI display 500 includes a graphical representation of the supplemental information 502 retrieved for taxiway KILO along with a graphical indication 504 of the airport moving map (AMM) database as the source of the supplemental information. In this regard, identifying the data source associated with the supplemental information allows the pilot or other user to assess the veracity, reliability and/or of the supplemental information and thereby ascertain the likely ground truth with respect to the supplemental information and/or the operational subject associated therewith. Additionally, in the illustrated embodiment, the supplemental information GUI display 500 includes a graphical representation of a navigational map 506 that may be rendered using supplemental information obtained from a navigational database to depict a region of the airport that includes a graphical representation of the KILO taxiway, thereby providing the pilot or other user with situational awareness of the physical location of the KILO taxiway in relation to the current aircraft location, the current runway or taxiway, and/or the like.

The supplemental information GUI display 500 also includes a button 508 or similar selectable element manipulable to allow a pilot or other user to revert the state of the display of the electronic device 402 back to the conversation log GUI display 400. In this regard, a pilot may utilize the buttons 408, 508 to quickly toggle back and forth between the conversation log GUI display 400 and the supplemental information GUI display 500 to quickly review the supplemental information in concert with reviewing the transcribed ATC clearance communication 406, thereby improving the pilot's overall situational awareness with respect to the transcribed ATC clearance communication 406 while alleviating the manual burden of consulting different systems or components onboard the aircraft to obtain the supplemental information and then mentally synthesizing the supplemental information in the context of the ATC clearance communication.

Figure 7:
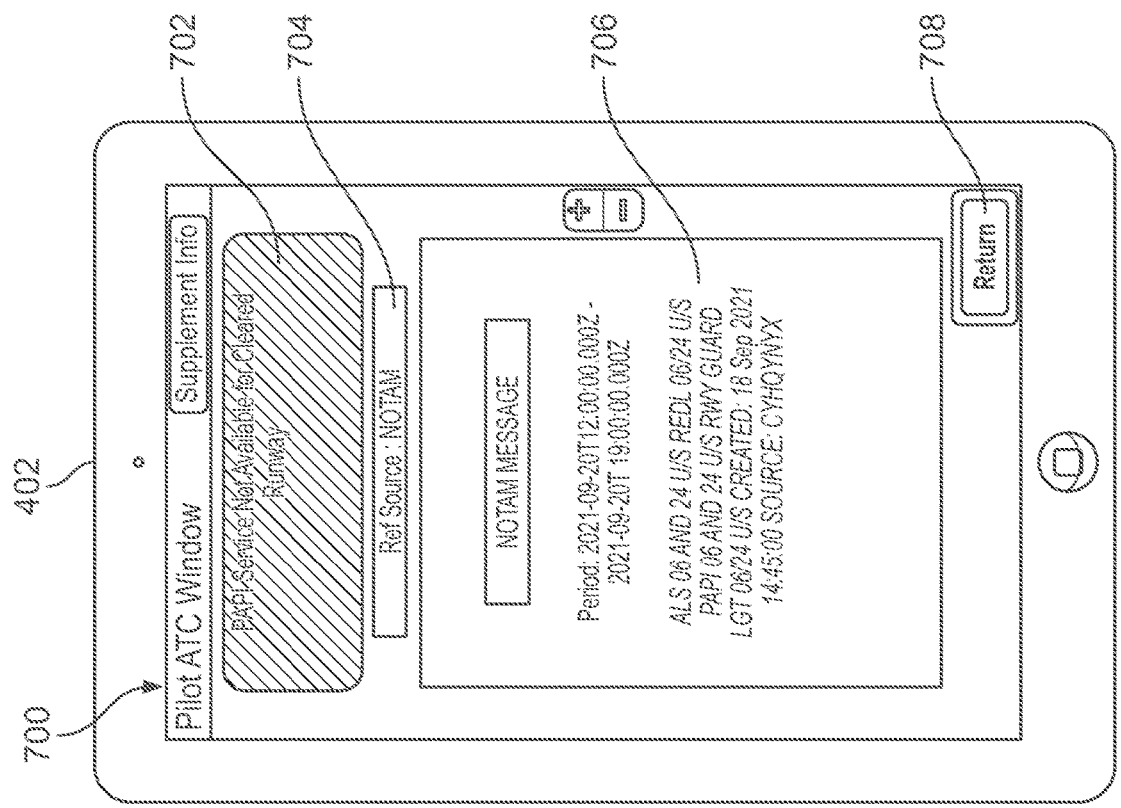
Figure 6:
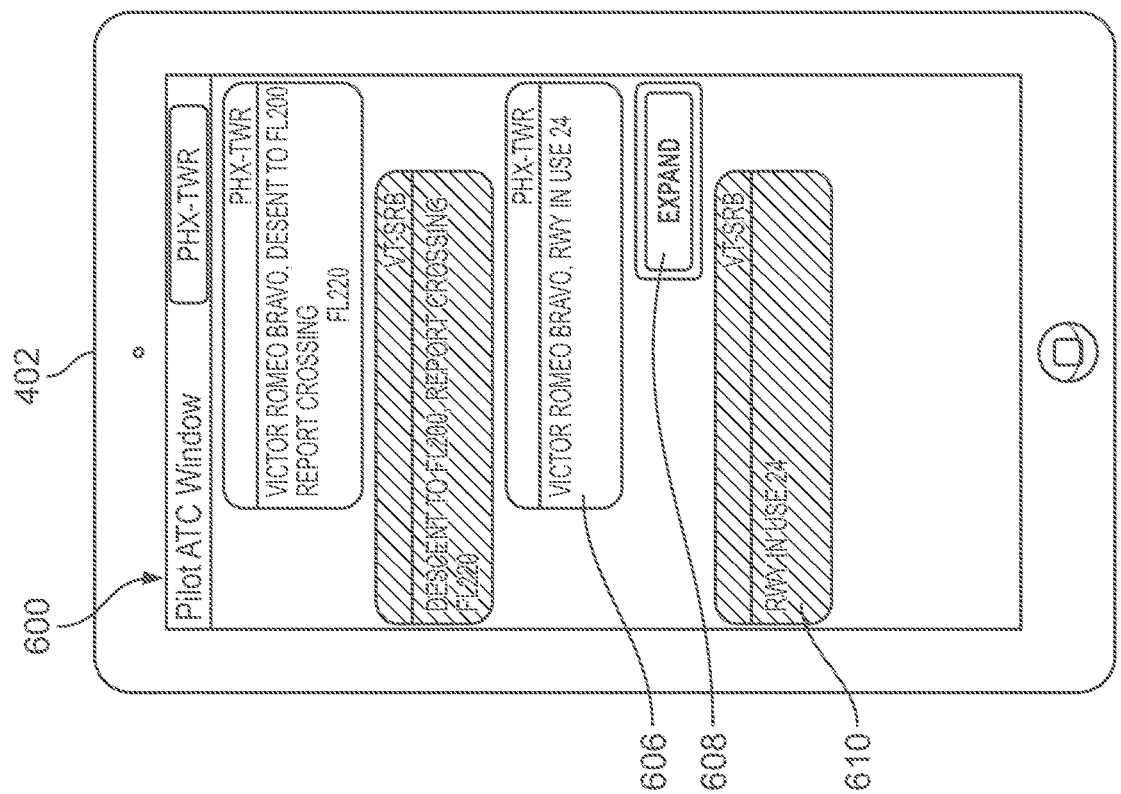

FIGS. 6-7 depict another exemplary sequence of a conversation log GUI display 600 and supplemental information GUI display 700 that may be depicted on a display associated with an electronic device 402 in connection with the supplemental display process 300 of FIG. 3. In this regard, FIGS. 6-7 depict a scenario where the pilot or other user selects the expand button 608 on the conversation log GUI display 600 to view supplemental information pertaining to runway 24 identified as the operational subject of the depicted transcribed ATC clearance communication 606. As shown in FIG. 7, the supplemental information GUI display 700 includes real-time information pertaining to runway 24 that was obtained by querying an onboard system 208 for any NOTAMs, PIREPs, ATIS messages or other real-time information associated with runway 24. In the illustrated embodiment, the supplemental information GUI display 700 includes a graphical representation of an autogenerated summary 702 of a NOTAM message pertaining to runway 24 along with a graphical representation of the NOTAM message 706 from which the autogenerated summary 702 was derived, a graphical indication 704 of a NOTAM message as the source of the supplemental information, and a button 708 for reverting back to the conversation log GUI display 600. To generate the summary 702 of the NOTAM message, the supplemental display process 300 analyzes the content of the NOTAM message 706 pertaining to runway 24 to filter or otherwise remove data or information from the NOTAM message 706 that is irrelevant to the clearance issued by the ATC to arrive at the autogenerated summary 702 that includes the data or information from the NOTAM message 706 that is most likely to be relevant to the issued clearance.

It should be noted that although FIG. 7 depicts the supplemental information GUI display 700 as a separate GUI display presented in lieu of the conversation log GUI display 600, in some embodiments, the supplemental information GUI display 700 may be rendered or otherwise presented within the conversation log GUI display 600 to allow a pilot or other user to concurrently view the identified supplemental information and the transcribed communication to which it pertains. For example, in response to selection of the expand button 608, the conversation log display application 230 may dynamically update the conversation log GUI display 600 by rendering the supplemental information GUI display 700 as a visually distinct region within the conversation log GUI display 600 in lieu of the expand button 608 and disposed vertically between the transcribed ATC clearance communication 606 to which it pertains and the subsequent transcribed clearance communication 610 depicted on the conversation log GUI display 600. In this manner, the sequential, chronological order of the depicted communications on the conversation log GUI display 600 may be preserved while selectively inserting supplemental information within the sequence of transcribed clearance communications as desired by the pilot or other user in response to selection of the expand button 608 and selectively removing the supplemental information in response to subsequent selection of the return button 708 associated with the supplemental information GUI display 700.

Figure 9:
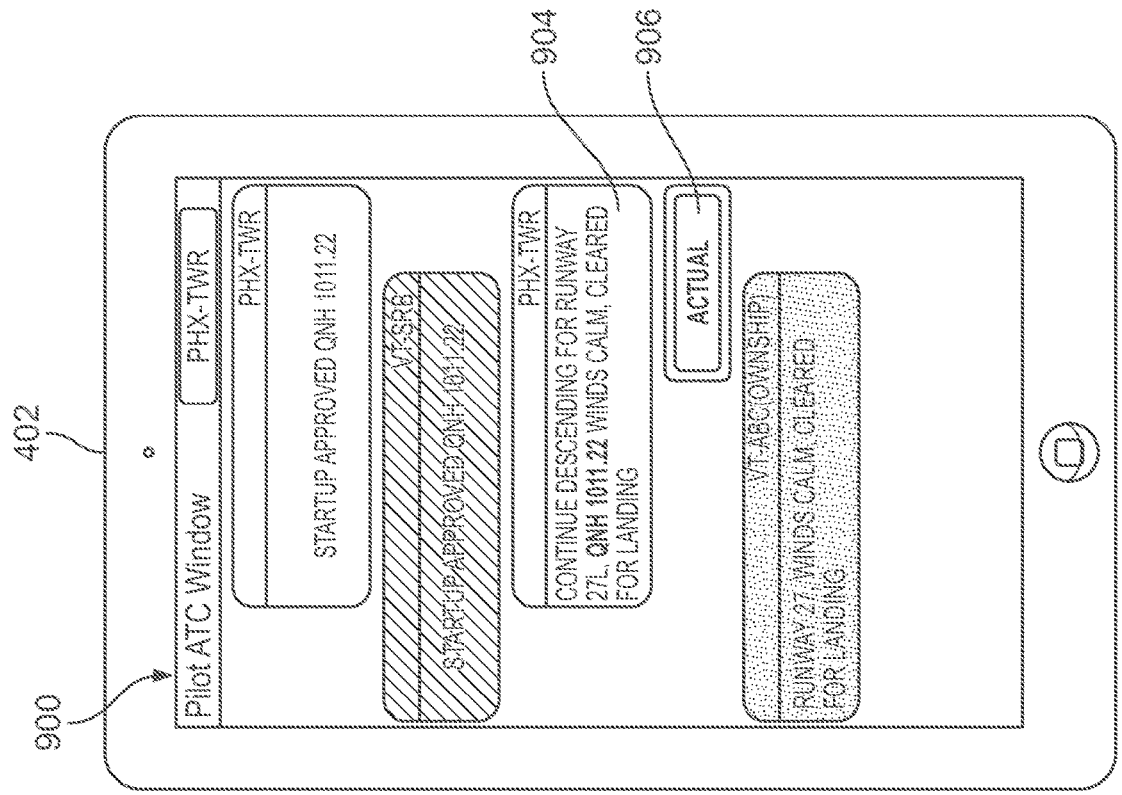
Figure 8:
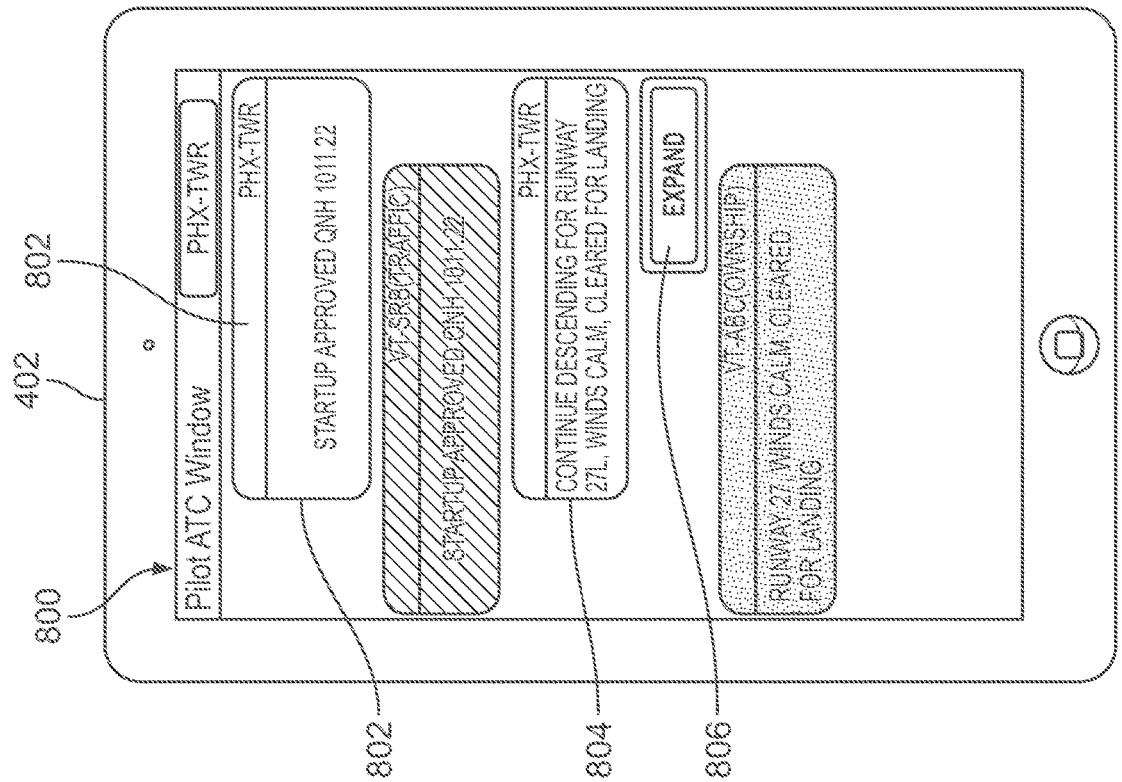

FIGS. 8-9 depict another exemplary sequence of a conversation log GUI display 800 and supplemental information GUI display 900 that may be depicted on a display associated with an electronic device 402 in connection with the supplemental display process 300 of FIG. 3. In this regard, FIGS. 8-9 depict a scenario where transcriptions of preceding clearance communications in the clearance table 224 are analyzed and utilized as the data source to obtain supplemental information including the altimeter setting associated with the runway at the airport that was previously assigned by the ATC in a preceding communication 802. In this regard, FIG. 8 depicts a state of the conversation log GUI display 800 after the supplemental display process 300 has identified runway 27L as the operational subject of the depicted transcribed ATC clearance communication 804 (e.g., task 302), obtained the altimeter setting associated with runway 27L from the preceding clearance communications (e.g., tasks 304, 306) and generated a corresponding button 806 on the conversation log GUI display 800 adjacent to the depicted clearance communication 804. Thus, when the ATC uses shorthand or fails to communicate some particular piece of information, the pilot or other user may select the button 806 to cause the supplemental display process 300 to generate the supplemental information GUI display 900 that includes a graphical representation of an augmented clearance communication 904 corresponding to the previously depicted clearance communication 804 that includes the altimeter setting (e.g., "QNH 1011.22"), thereby allowing the pilot or other user to obtain the supplemental information without having to review preceding clearance communications to manually locate the information. The supplemental information GUI display 900 also includes a button 906 configured to allow the user to revert to the state of the conversation log GUI display 800 depicted in FIG. 8 by restoring the augmented clearance communication 904 back to the original or actual clearance communication 804.

By consolidating and integrating the presentation of supplemental information with the presentation of transcriptions of ATC clearance communications between pilots and ATC, a pilot or other user is provided with an intuitive and comprehensive view of communications with respect to an aircraft. In this regard, the conversation log GUI display provides a complete summary of the conversation between the pilot and ATC in a chronological manner while allowing the pilot or ATC to selectively toggle the conversation log GUI display to review supplemental information relevant to a desired clearance communication, thereby allowing the pilot or ATC to brief the sequence of clearance communications and relevant supplemental information at one device or location, reducing pilot workload and head-down time and improving situational awareness. Making supplemental information more readily available may improve a pilot's ability to operate an aircraft at an unfamiliar airport or other unfamiliar location, which in turn, may reduce congestion and reduce the likelihood of a pilot or ATC misunderstanding during clearance communications.

For the sake of brevity, conventional techniques related to user interfaces, speech recognition, avionics systems, datalink systems, messaging systems, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method comprising:
obtaining a transcription of an audio air traffic control (ATC) clearance communication with respect to an aircraft, the audio ATC clearance communication comprising an instruction or a request for the aircraft;
generating, on a display device onboard the aircraft, a graphical user interface (GUI) display comprising a graphical representation of the transcription of the audio ATC clearance communication;
analyzing the transcription to identify an operational subject associated with the audio ATC clearance communication related to a current operational context of the aircraft identified based on status information from one or more systems onboard the aircraft;
obtaining supplemental information pertaining to the operational subject from a data source onboard the aircraft different from the transcription of the audio ATC clearance communication, wherein the supplemental information is not included in the transcription of the audio ATC clearance communication;
generating, on the GUI display, a selectable GUI element associated with the graphical representation of the transcription of the audio ATC clearance communication, wherein the selectable GUI element is associated with the supplemental information; and
in response to user selection of the selectable GUI element, generating, within the GUI display on the display device, a graphical representation of the supplemental information associated with the audio ATC clearance communication and a second selectable GUI element to revert a state of the GUI display on the display device.

2. The method of claim 1, wherein generating the graphical representation of the supplemental information comprises generating a supplemental GUI display in lieu of a conversation log GUI display depicting the graphical representation of the transcription of the audio ATC clearance communication, wherein the supplemental GUI display includes the graphical representation of the supplemental information and the second selectable GUI element to revert the state of the GUI display on the display device to the conversation log GUI display.

3. The method of claim 1, wherein generating the graphical representation of the supplemental information comprises generating a supplemental GUI display including the graphical representation of the supplemental information within a conversation log GUI display.

4. The method of claim 1, wherein:
the data source comprises a navigation database;
obtaining the supplemental information comprises querying the navigation database to obtain navigational information associated with the operational subject; and
generating the graphical representation of the supplemental information comprises generating a navigational map pertaining to the operational subject using the navigational information.

5. The method of claim 1, wherein:
the data source comprises a flight management system (FMS) onboard the aircraft;
obtaining the supplemental information comprises querying the FMS to obtain flight plan information associated with the operational subject; and
generating the graphical representation of the supplemental information comprises generating a graphical representation based at least in part on the flight plan information.

6. The method of claim 1, wherein:
the data source comprises a traffic monitoring system onboard the aircraft;
obtaining the supplemental information comprises querying the traffic monitoring system to obtain traffic information associated with the operational subject; and
generating the graphical representation of the supplemental information comprises generating a graphical representation based at least in part on the traffic information.

7. The method of claim 1, wherein:
the operational subject comprises one of a runway, a taxiway, a waypoint, an avionics system, an avionics setting, an aircraft action and an aircraft parameter; and
the supplemental information is not included in the transcription of the audio ATC clearance communication.

8. The method of claim 1, wherein:
the supplemental information comprises real-time information associated with the operational subject; and
generating the graphical representation of the supplemental information comprises generating a graphical representation based at least in part on the real-time information.

9. The method of claim 8, wherein the data source comprises one of a pilot report (PIREP), a notice to airmen (NOTAM) and an automated terminal information service (ATIS).

10. The method of claim 1, further comprising generating, on the display device, a graphical indication of the data source associated with the supplemental information.

11. The method of claim 1, wherein:
analyzing the transcription comprises utilizing the current operational context to identify the operational subject consistent with the current operational context that is a subject of the audio ATC clearance communication;
obtaining the supplemental information comprises querying the data source using the operational subject of the audio ATC clearance communication as a search key to obtain the supplemental information;

the current operational context comprises at least one of a current flight phase, a current aircraft configuration, a current aircraft altitude, a current heading and a current speed of the aircraft; and the operational subject comprises an airport, a runway, a taxiway, a waypoint, an avionics system, an avionics setting, an aircraft procedure or an aircraft action related to operation of the aircraft.

12. The method of claim 1, wherein:

the GUI display comprises a conversation log GUI display depicting the graphical representation of the transcription of the audio ATC clearance communication; and generating the graphical representation of the supplemental information comprises:

generating a navigational map depicting at least one of the supplemental information and the operational subject on the display device in lieu of the conversation log GUI display in response to user selection of the selectable GUI element; and reverting the state of the GUI display on the display device to the conversation log GUI display in response to second user selection of the second selectable GUI element.

13. A computer-readable medium having computer-executable instructions stored thereon that, when executed by a processing system, cause the processing system to:

obtain a transcription of an audio air traffic control (ATC) clearance communication with respect to an aircraft, the audio ATC clearance communication comprising an instruction or a request for the aircraft;

generate, on a display device onboard the aircraft, a graphical user interface (GUI) display comprising a graphical representation of the transcription of the audio ATC clearance communication;

analyze the transcription to identify an operational subject associated with the audio ATC clearance communication related to a current operational context of the aircraft identified based on status information from one or more systems onboard the aircraft;

obtain supplemental information pertaining to the operational subject from a data source onboard the aircraft different from the transcription of the audio ATC clearance communication, wherein the supplemental information is not included in the transcription of the audio ATC clearance communication;

generate, on the GUI display, a selectable GUI element associated with the graphical representation of the transcription of the audio ATC clearance communication, wherein the selectable GUI element is associated with the supplemental information; and in response to user selection of the selectable GUI element, generate, within the GUI display on the display device, a graphical representation of the supplemental information associated with the audio ATC clearance communication and a second selectable GUI element to revert a state of the GUI display on the display device.

14. The computer-readable medium of claim 13, wherein the computer-executable instructions cause the processing system to query the data source using identifying information associated with the operational subject to obtain the supplemental information from the data source.

15. The computer-readable medium of claim 13, wherein the computer-executable instructions cause the processing system to generate, on the display device, a supplemental GUI display in lieu of a conversation log GUI display depicting the graphical representation of the transcription of the audio ATC clearance communication, wherein the supplemental GUI display includes the graphical representation of the supplemental information and the second selectable GUI element to revert the state of the GUI display on the display device to the conversation log GUI display.

16. The computer-readable medium of claim 15, wherein the supplemental GUI display comprises a navigational map depicting at least one of the supplemental information and the operational subject.

17. The computer-readable medium of claim 13, wherein the computer-executable instructions cause the processing system to generate, on the display device, a supplemental GUI display within a conversation log GUI display, wherein the supplemental GUI display includes the graphical representation of the supplemental information.

18. The computer-readable medium of claim 17, wherein the computer-executable instructions cause the processing system to substitute the supplemental GUI display for the selectable GUI element in response to selection of the selectable GUI element.

19. A system comprising:

a display device onboard an aircraft;

a data storage element to maintain a transcription of an audio air traffic control (ATC) clearance communication with respect to the aircraft, the audio ATC clearance communication comprising an instruction or a request for the aircraft; and a processing system coupled to the display device and the data storage element to:

generate, on the display device, a graphical user interface (GUI) display comprising a graphical representation of the transcription of the audio ATC clearance communication;

analyze the transcription to identify an operational subject associated with the audio ATC clearance communication related to a current operational context of the aircraft identified based on status information from one or more systems onboard the aircraft;

obtain supplemental information pertaining to the operational subject from a data source coupled to the processing system, the data source being different from the data storage element, wherein the supplemental information is not included in the transcription of the audio ATC clearance communication;

generate, on the GUI display, a selectable GUI element associated with the graphical representation of the transcription of the audio ATC clearance communication, wherein the selectable GUI element is associated with the supplemental information; and in response to user selection of the selectable GUI element, generate, within the GUI display on the display device, a graphical representation of the supplemental information associated with the audio ATC clearance communication and a second selectable GUI element to revert a state of the GUI display on the display device.

20. The system of claim 19, wherein the data source comprises at least one of a navigation database, a flight management system (FMS), a communications system, an avionics system, a pilot report (PIREP), a notice to airmen (NOTAM) and an automated terminal information service (ATIS).

* * * * *